United States Patent [19]

Steinbrenner et al.

[11] Patent Number: 5,093,860

[45] Date of Patent: Mar. 3, 1992

[54] KEY MANAGEMENT SYSTEM

[75] Inventors: Kurt W. Steinbrenner, Bartlett; Michael W. Bright, Arlington Heights, both of Ill.

[73] Assignee: Motorola, Inc., Schaumburg, Ill.

[21] Appl. No.: 589,138

[22] Filed: Sep. 27, 1990

[51] Int. Cl.$^5$ ............................. H04L 9/08; H04L 9/10
[52] U.S. Cl. ......................................... 380/21; 380/50; 380/52
[58] Field of Search ...................... 380/21, 49, 50, 52

[56] References Cited

U.S. PATENT DOCUMENTS

| | | | |
|---|---|---|---|
| 4,281,216 | 7/1981 | Hogg et al. | 380/21 |
| 4,731,840 | 3/1988 | Mniszewski et al. | 380/21 |
| 4,897,875 | 1/1990 | Pollard et al. | 380/21 |
| 4,965,804 | 10/1990 | Trbovich et al. | 380/21 |

Primary Examiner—Bernarr E. Gregory
Attorney, Agent, or Firm—Steven G. Parmelee; Joseph P. Krause; Anthony J. Sarli

[57] ABSTRACT

This key management system effectively solves the key distribution problems of distance, time, operator error, and security risk by transferring encryption keys with appropriate system information between a key management controller (101) and a remote keyloader (109). The keyloader (109) is then coupled to a communication device to transfer (327) the keys and receive (329) identification information from the communication device. The keyloader (109) then sends (323) the information to the key management controller (101) that controls the distribution of the encryption keys and collection of the communication device identifications.

15 Claims, 3 Drawing Sheets

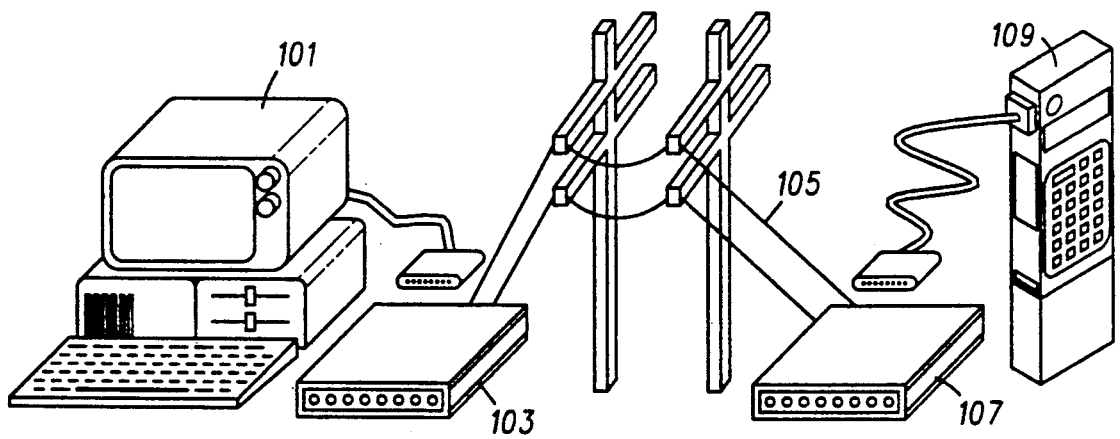
FIG.1A
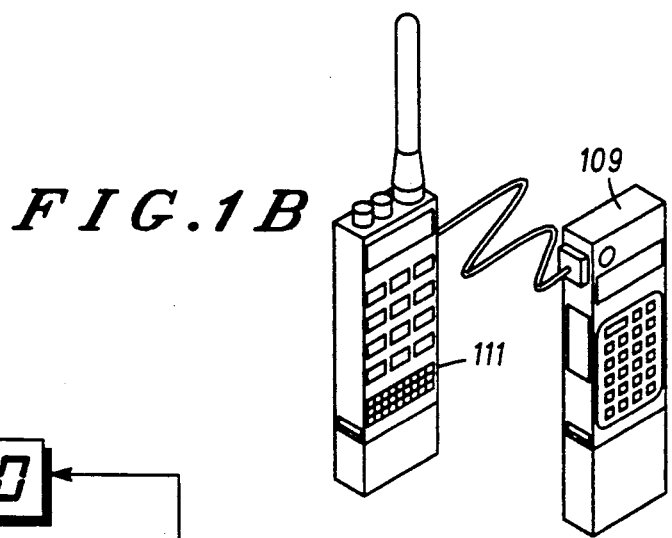
FIG.1B
FIG.2
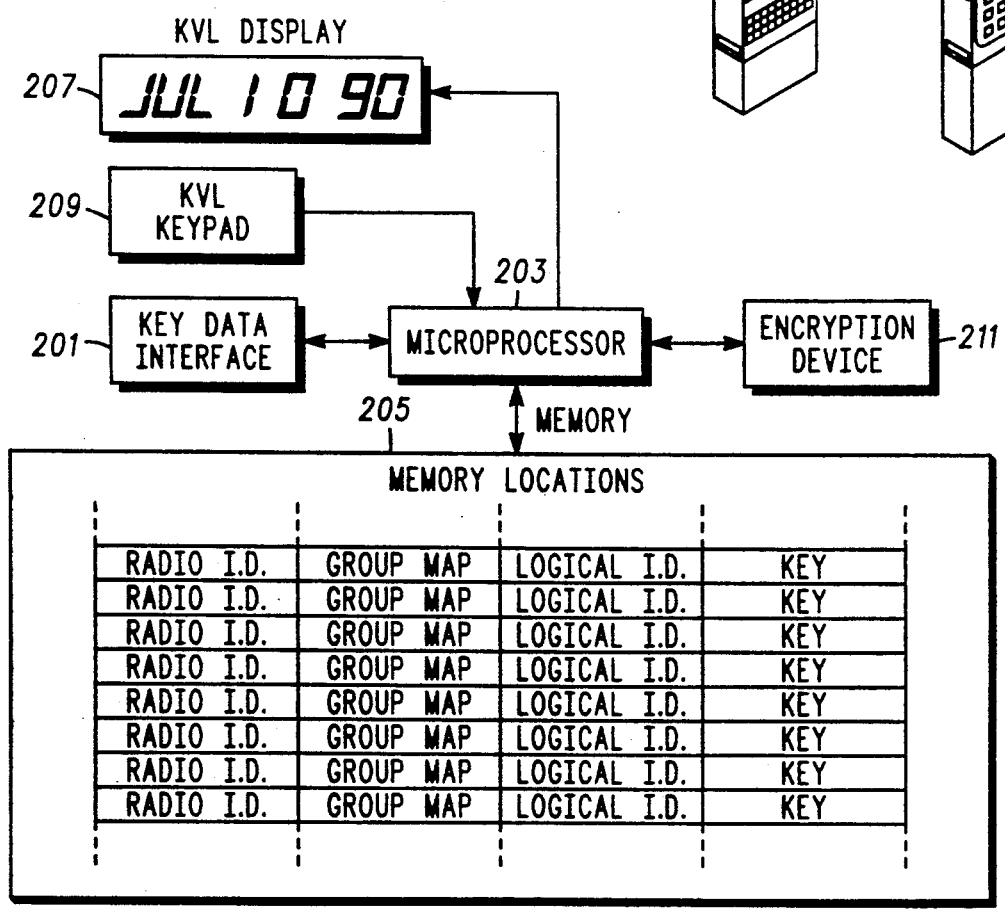

KEY MANAGEMENT SYSTEM

FIELD OF THE INVENTION

This invention is concerned with encrypted communication systems. More particularly, this invention is concerned with key management for an encrypted communication system.

BACKGROUND OF THE INVENTION

Encrypted voice and data systems are well known. Many of these systems provide secure communication between two or more users by sharing one piece of information between the users, which permits only those users knowing it to properly decrypt the message. This piece of information is known as the encryption key variable, or key for short. Loading this key into the actual encryption device in the secure communication unit is a basic requirement that allows secure communication to occur. To retain security over a long period of time, the keys are changed periodically, typically weekly or monthly.

Loading new keys, called rekeying, can be done in various ways. Over-the-channel rekeying is achieved by transmitting the encrypted keys from a central keyloading site either individually or simultaneously to all units in the group over a typical encrypted communication channel.

Manual rekeying is accomplished by plugging a cable from a portable, hand-held keyloading device (also called a key variable loader, or keyloader for short) to the secure unit and downloading the keys from the keyloader into the secure unit by pressing the appropriate buttons on the keyloader. Over-the-channel rekeying takes a few seconds, and the process involved in manual keyloading, including locating the unit, connecting the loader, etc., takes much longer.

Before over-the-channel rekeying was available, manual rekeying was the primary technique available for rekeying. In communication systems with hundreds of users, it was necessary to have several keyloaders to rekey the entire system in a reasonable amount of time. These keyloaders are not inexpensive and require manual entry of keys, a time-consuming procedure that is prone to operator error and is inherently a security risk. It is possible to download unencrypted keys from one keyloader to another, called cloning, by connecting the keyloaders together via a cable, thereby removing operator error during the entry of the key variables. Keyloaders are typically spread over the entire area of the system, which can be thousands of square kilometers. This makes exclusive use of cloning impractical for a large system.

It is evident that use of an over-the-channel rekeying system is a big time-saver and a security improvement when rekeying a large system. Using such a system reduces the need for a large number of keyloaders. There may be older secure units in the system that are incapable of over-the-channel rekeying or there may be some remote areas in the system that are out of range of the over-the-channel rekey system, thus keyloaders are still needed. These keyloaders must still receive the new keys, and the old problems of distance, time, operator error, and security risk have not gone away.

With the continually increasing size of systems and the growing need for system security, it is apparent that a more practical approach to key distribution for keyloaders is essential.

SUMMARY OF THE INVENTION

This invention encompasses a key management system for a secure communication system, using a keyloader to load at least one encryption key into a communication device and controlling the distribution of a plurality of encryption keys. At least one of the plurality of encryption keys is conveyed to the keyloader, which is coupled to the communication device for transfer of the at least one of the plurality of encryption keys.

BRIEF DESCRIPTION OF THE DRAWINGS

FIG. 1A and 1B incorporate a diagram of a key management system in accordance with the invention.

FIG. 2 is a block diagram of a keyloader in accordance with the invention.

DESCRIPTION OF A PREFERRED EMBODIMENT

Figure 3:
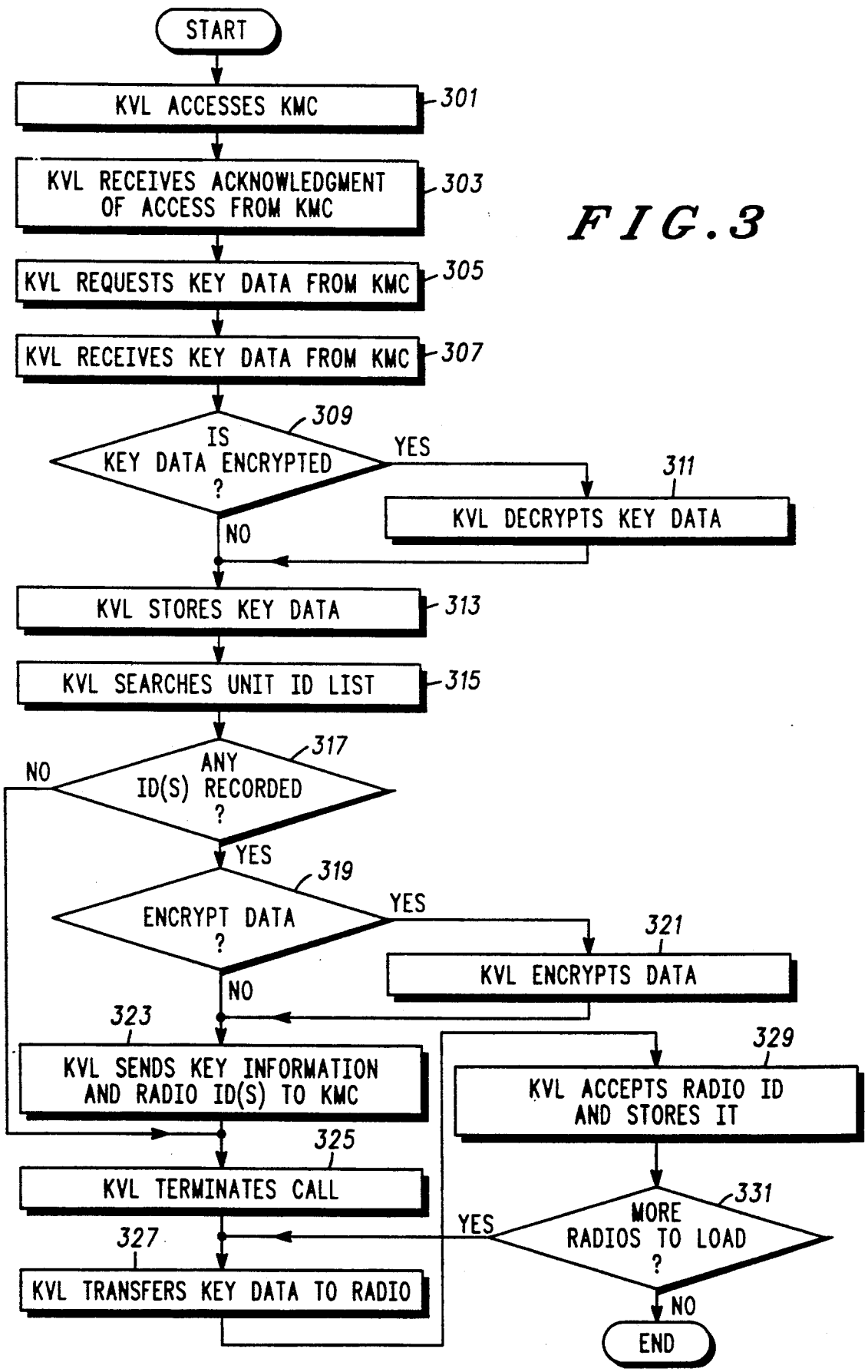
FIG. 3 is a flowchart illustrating the steps executed by a keyloader in a key management system in accordance with the invention.

The following describes a method and apparatus for key management in an over-the-channel rekey system. In the preferred embodiment, the over-the-channel rekey system includes a Key Management Controller (KMC), a key variable loader (KVL), such as a T3011CX, and a mobile radio, such as a Syntor X 9000, all available from Motorola, Inc. A conventional data modem is optional. The KMC includes a database that records in its RAM secure unit IDs, keys, and which units have/need what keys, and is a central control point for distributing this data over the communication channel.

In the preferred embodiment of the invention, the user requests information from the KMC with commands entered into the KVL, also known as a remote KVL. Referring to FIG. 1A, the user initiates the transfer by entering the proper commands into the KVL 109, which in turn places a phone call to access the KMC 101 through the modem 107, standard telephone lines 105, and the modem 103 attached to the KMC 101. Key data, such as the logical ID, key group map, and encryption key, is passed from the KMC 101 to the modem 103, which passes the information along the telephone lines 105 to the modem 107 attached to the KVL 109. In the preferred embodiment of the invention, all key data passed between the KMC 101 and KVL 109 is encrypted for security reasons. The KVL 109 may be connected directly to the KMC 101 with a null modem if in close proximity. The null modem replaces the first modem 103, the telephone lines 105, and the second modem 107 from FIG. 1A. The KVL 109 is then used to transfer key data to the radio 111 or other encrypted unit. Whether using telephone lines with modems or a null modem, the channel for key transfer is not the same as the one(s) used for over-the-channel rekeying or encrypted voice or data communications.

Transfer of key data using a remote KVL removes the necessity for an operator to enter the data manually, thereby increasing security, because he does not know the actual encryption keys. Operator error is reduced, since he does not enter the keys with the keypad. With any telephone lines, data can be transferred easily without travelling a great distance, thus saving time while reaching devices outside the KMC radio calling range. Utilizing a remote KVL allows radios from older systems without over-the-channel rekeying capability to be integrated easily with newer systems having the capability.

FIG. 2 shows a block diagram of a KVL in accordance with the invention. The KVL is connected to the KMC, via telephone line, at the key data interface 201. A user calls the KMC by manipulation of the KVL keypad 209. The KVL microprocessor 203 then accesses the KMC through the key data interface 201. When the KMC accepts the call, the microprocessor 203 receives the acknowledgment through the key data interface 201 and puts a message on the KVL display 207. The microprocessor 203 automatically sends a request for key variable data to the KMC. The KMC receives the request from the KVL and sends the appropriate encrypted data which enters the key data interface 201 into the microprocessor 203. The microprocessor 203 determines if the data is encrypted, and if so, sends it to the encryption device 211 for decryption and stores the resultant information in memory 205. The user then disconnects the KVL from the KMC and attaches it to a radio. The desired key transfer is entered by keypad 209. Typical key transfer protocol is completed, and the radio identification (ID) is transferred to the microprocessor 203 through the key data interface 201. This ID is stored in memory 205 with the key(s) sent to the radio. After the keys and/or group maps have been distributed to a group of radios or other encrypted devices, the user reconnects the KVL to the KMC. After repeating the procedure to place a call to the KMC, the KMC acknowledges the connection. Upon receiving the acknowledgment, the KVL sends a request for more key variable data. After receiving a new set of key data, the KVL uploads the previously recorded radio IDs with the logical ID of the key or group map transferred to each radio. This information may be encrypted by the encryption device 211, as directed by the microprocessor 203. This data is sent through the key data interface 201 to the KMC to complete the cycle.

The KVL has an identification code, stored in memory 205, which is used by the KMC to verify proper access of key data, as a measure of additional security. Although not described here, other key information may be stored in memory 205. The KMC phone number, which is entered into the KVL with the keypad 209, may also be stored in memory 205.

The KVL can receive encrypted data, for additional security, or unencrypted data through its key data interface 201. The ability to process encrypted data received on the key data interface, allows the KMC to transfer sensitive data to the KVL at a remote location without security risk.

FIG. 3 is a flowchart illustrating the steps executed by a remote keyloader in the key management system of the preferred embodiment. Summarizing the flowchart, the KVL accesses 301 the KMC and receives 303 acknowledgment of the access from the KMC. The KVL then requests 305 and receives 307 key data from the KMC. The KVL determines 309 if the data is encrypted, decrypts 311 it, and stores 313 it. If the data is not encrypted 309, the KVL discards it in the preferred embodiment of the invention. After all of the key data has been transferred, the KVL searches 315 the unit ID list to see if data has been transferred to any radio units. If any IDs have been recorded 317, then the KVL sends 323 the previously recorded unit IDs with the key information, such as the logical ID of the key or group map transferred to each unit, after encrypting 321 the data, if desired 319. The KVL then terminates 325 the call. When connected to a radio, the KVL transfers 327 the key data. The KVL then accepts the radio ID (or unit ID) and stores it in memory. When all radios have had the key data transferred to them 331, the KVL is ready to access the KMC to request additional key data and to send the IDs recorded.

Figure 4:
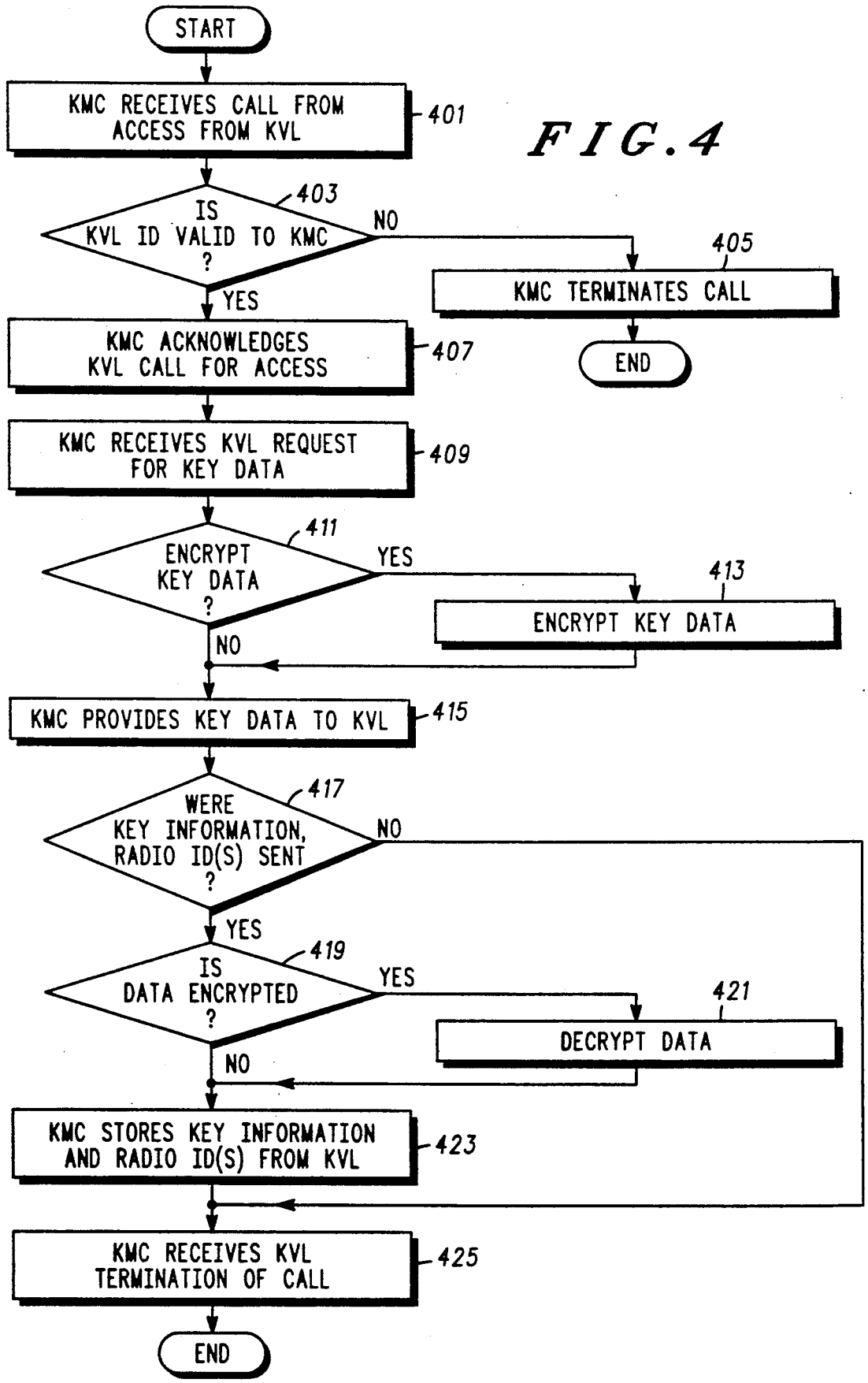
FIG. 4 is a flowchart illustrating the steps executed when using a Key Management Controller in a key management system in accordance with the invention.

FIG. 4 is a flowchart illustrating the steps executed when using a KMC in the key management system of the preferred embodiment. Briefly, the KMC receives 401 a call for access from the KVL, including a KVL ID. The KMC checks 403 the KVL ID for validity. If an invalid KVL ID is found, the KMC terminates 405 the call. Upon recognition of a valid KVL ID, the KMC acknowledges 407 the KVL's call and waits until it receives 409 a request for key data from the KVL. The KMC encrypts 413, if desired 411, and provides 415 the key data to the KVL. The KMC may now accept previously recorded unit IDs and key information sent 417 by the KVL. The KMC determines 419 if the data from the KVL was encrypted, decrypts 421 it if necessary, and stores 423 it. The KMC then receives 425 notice of call termination from the KVL.

We claim:

1. A key management system for a secure communication system, using a keyloader to load at least one encryption key into a communication device, comprising:
means for controlling distribution of a plurality of encryption keys;
means, coupled to said means for controlling, for conveying at least one of said plurality of encryption keys to the keyloader;
means for coupling the keyloader to the communication device; and
means for transferring said at least one of said plurality of encryption keys to the communication device.

2. The key management system of claim 1, further comprising means for storing said plurality of encryption keys.

3. The key management system of claim 1 further comprising:
means, coupled to said means for transferring, for accepting an identification from the communication device; and
means, coupled to said means for conveying, for sending said identification to said means for controlling.

4. The key management system of claim 3 further comprising means for encrypting said identification.

5. The key management system of claim 4 further comprising means for decrypting said encrypted identification.

6. The key management system of claim 1 further comprising means for encrypting said at least one of said plurality of encryption keys.

7. The key management system of claim 6, further comprising:
means for determining if said at least one of said plurality of encryption keys is encrypted; and means, coupled to said means for determining, for decrypting said encrypted at least one of said plurality of encryption keys.

8. A keyloader for use with an external communication device in a key management system employing an external source of key control, comprising:

means for entering user information;

means, coupled to said means for entering, for accessing the external source of key control;

means, coupled to said means for entering, for requesting at least one encryption key from the external source of key control;

means, for receiving said at least one requested encryption key;

means, coupled to said receiving means, for storing said at least one requested encryption key; and means, coupled to said storing means, for transferring said at least one requested encryption key to the external communication device.

9. The keyloader of claim 8, further comprising:

means, coupled to said means for transferring, for accepting an identification from the external communication device; and means, coupled to said means for accepting, for sending said identification to the external source of key control.

10. The keyloader of claim 9, further comprising means, coupled to said means for accepting, for encrypting said identification.

11. The keyloader of claim 8, further comprising:

means, coupled to said means for receiving, for determining if said at least one requested encryption key is encrypted; and means, coupled to said means for determining, for decrypting said at least one encrypted encryption key.

12. A method of key management in a key loader for use with an external communication device in a key management system employing an external source of key control, comprising the steps of:

accessing the external source of key control;

requesting, responsive to said step of accessing, at least one encryption key from the external source of key control;

receiving, responsive to said step of requesting, said at least one encryption key from the external source of key control;

storing, responsive to said step of receiving, said at least one received encryption key; and transferring said at least one received encryption key to the external communication device.

13. The method of key management of claim 12, further comprising the steps of:

accepting, responsive to said step of transferring, an identification from the external communication device; and sending, responsive to said step of accepting, said identification to the external source of key control.

14. The method of key management of claim 13, further comprising the step of encrypting said identification.

15. The method of key management of claim 12, further comprising the steps of:

determining, responsive to said step of receiving, if said at least one received encryption key is encrypted; and decryption, responsive to said step of determining, said at least one received encrypted encryption key.

* * * * *